US007596595B2

(12) United States Patent
Budge et al.

(10) Patent No.: US 7,596,595 B2
(45) Date of Patent: Sep. 29, 2009

(54) EFFICIENT UNICAST-BASED MULTICAST TREE CONSTRUCTION AND MAINTENANCE FOR MULTIMEDIA TRANSMISSION

(75) Inventors: Scott Budge, Logan, UT (US); Yutao Han, Logan, UT (US)

(73) Assignee: Utah State University, Logan, UT (US)

( * ) Notice: Subject to any disclaimer, the term of this patent is extended or adjusted under 35 U.S.C. 154(b) by 932 days.

(21) Appl. No.: 10/464,619

(22) Filed: Jun. 18, 2003

(65) Prior Publication Data

US 2004/0260814 A1 Dec. 23, 2004

(51) Int. Cl.
*H04L 12/28* (2006.01)
*H04L 12/56* (2006.01)

(52) U.S. Cl. ............... 709/204; 709/201; 709/203; 709/227; 370/408

(58) Field of Classification Search ............ 709/227, 709/223–226, 201, 203, 204, 205; 370/408
See application file for complete search history.

(56) References Cited

U.S. PATENT DOCUMENTS

| | | | | |
|---|---|---|---|---|
| 4,412,285 A | | 10/1983 | Neches et al. ............... 364/200 |
| 4,543,630 A | | 9/1985 | Neches ...................... 364/200 |
| 5,289,460 A | * | 2/1994 | Drake et al. ................ 370/245 |
| 5,517,494 A | * | 5/1996 | Green ........................ 370/408 |
| 5,862,329 A | | 1/1999 | Aras et al. ............. 395/200.34 |
| 5,881,246 A | | 3/1999 | Crawley et al. ........ 395/200.68 |
| 5,910,179 A | | 6/1999 | Mohseni .................... 709/252 |
| 6,134,599 A | * | 10/2000 | Chiu et al. ................. 709/252 |
| 6,192,051 B1 | | 2/2001 | Lipman et al. ............. 370/389 |
| 6,195,687 B1 | | 2/2001 | Greaves et al. ............. 709/208 |
| 6,252,856 B1 | * | 6/2001 | Zhang ....................... 370/254 |
| 6,334,156 B1 | | 12/2001 | Matsuoka et al. .......... 709/252 |
| 6,359,886 B1 | | 3/2002 | Ujihara et al. ............. 370/392 |
| 6,370,583 B1 | | 4/2002 | Fishler et al. .............. 709/238 |
| 6,505,254 B1 | | 1/2003 | Johnson et al. ............ 709/239 |
| 6,684,331 B1 | * | 1/2004 | Srivastava .................. 713/163 |
| 6,691,312 B1 | * | 2/2004 | Sen et al. ..................... 725/96 |
| 6,697,365 B1 | * | 2/2004 | Messenger ................. 370/390 |
| 6,901,510 B1 | * | 5/2005 | Srivastava .................. 713/163 |
| 7,035,933 B2 | * | 4/2006 | O'Neal et al. .............. 709/233 |
| 7,117,273 B1 | * | 10/2006 | O'Toole et al. ............ 709/252 |
| 2001/0014097 A1 | * | 8/2001 | Beck et al. ................. 370/401 |
| 2001/0052012 A1 | | 12/2001 | Rinne et al. | |
| 2002/0035602 A1 | | 3/2002 | Garcia-Luna-Aceves et al. ......................... 709/204 |
| 2002/0038253 A1 | | 3/2002 | Seaman et al. .............. 705/26 |
| 2002/0087523 A1 | * | 7/2002 | Sivaraman ..................... 707/3 |
| 2002/0091810 A1 | | 7/2002 | Hundscheidt et al. ....... 709/223 |
| 2002/0091855 A1 | | 7/2002 | Yemini et al. ............. 709/238 |
| 2002/0095460 A1 | | 7/2002 | Benson ..................... 709/204 |
| 2002/0169833 A1 | * | 11/2002 | Tani et al. .................. 709/205 |
| 2003/0005149 A1 | | 1/2003 | Haas et al. ................. 709/238 |
| 2003/0212795 A1 | * | 11/2003 | Harris et al. ............... 709/227 |

(Continued)

*Primary Examiner*—Ario Etienne
*Assistant Examiner*—Philip J Chea
(74) *Attorney, Agent, or Firm*—Workman Nydegger

(57) ABSTRACT

A multi-endpoint communication system comprising communication nodes linked in a tree structure by unicast connections includes a server to receive a request from a new communication node to join the tree structure. The system further includes a node selector to identify one of the plurality of communication nodes that is likely to be in a same local area network as the new communication node. In addition, the system includes a node linker to connect the new communication node to the identified communication node within the tree structure.

15 Claims, 10 Drawing Sheets

U.S. PATENT DOCUMENTS

2004/0018839 A1* 1/2004 Andric et al. ............... 455/433
2004/0052012 A1* 3/2004 Boughton et al. .............. 361/7
2004/0236863 A1* 11/2004 Shen et al. .................. 709/231

* cited by examiner

—— Different subnets
High-bandwidth connection

——— Same subnets
Low-bandwidth connection

EFFICIENT UNICAST-BASED MULTICAST TREE CONSTRUCTION AND MAINTENANCE FOR MULTIMEDIA TRANSMISSION

TECHNICAL FIELD

The present invention relates generally to the field of electronic communication. More specifically, the present invention relates to techniques for decreasing latency and increasing bandwidth in a multi-endpoint communication system.

BACKGROUND OF THE INVENTION

Multi-endpoint communication is the sharing of information, such as video, audio, and/or data, between three or more parties. One example of a multi-endpoint communication system is a Distance Education System (DES), in which a teacher and multiple students may interact in a virtual "classroom" despite being geographically separated.

Various methods exist for implementing multi-endpoint communication. One is to use simple unicast, where separate connections are established between the sender (e.g., the teacher) and all receivers (e.g., the students). If there are N parties involved in the transmission, the sender must establish N-1 unicast connections and transmit the data N-1 times over the network. When N is large, the problems of scalability, network resource utilization, and the workload on the sender become evident.

Internet Protocol (IP) multicast attempts to solve this problem by sending a single copy of data to all receivers in the same group. Since only one copy of data is sent, the heavy traffic introduced by the multi-endpoint system is greatly reduced. Because of this advantage, many multicast protocols have been developed, such as Internet Group Management Protocol (IGMP), Distance Vector Multicast Routing Protocol (DVMRP), Core Based Tree (CBT), Protocol Independent Multicast (PIM) for Intra-AS multicast and Border Gateway Multicast Protocol (BGMP) for Inter-AS multicast.

Although IP multicast has existed for more than ten years, several technical issues make it difficult to deploy on the global Internet. For example, all of the intermediate routers must be IP Multicast enabled and Class D IP addresses must be used. Likewise, any firewalls in the communication channel must be reconfigured, group information must be managed, and all of the receivers must have special network cards and software that supports IP multicast.

Due to the problems mentioned above, other methods have to be designed to make multi-endpoint communication more feasible. Unicast-based multicast is such a method. As most Internet protocols are designed for unicast, they are easy to implement, and many development tools exist. Since all routers support unicast, special multicast routers are no longer needed, allowing applications to run anywhere. Furthermore, no group management is involved, and no Class D IP addresses are needed.

In one approach, a server sends data to two (or more) receivers by unicast. Thereafter, each receiver rebroadcasts the data to two more receivers, and so on. In this way, a multicast tree is formed. Except for the root node (server) and leaf nodes, each intermediate node is both the receiver and the transmitter and is sometimes referred to as a "repeater." Each repeater not only plays the data stream back to its audience, but also transmits the data stream to two other child nodes. Unicast-based multicast has the advantages of lower cost and increased flexibility.

However, since the tree is typically well balanced, two repeaters or receivers within the same Local Area Network (LAN) may be located in two different branches of the multicast tree. Hence, the tree does not take advantage of the higher bandwidth and lower latencies available within the LAN, reducing the overall performance of the system.

SUMMARY OF THE INVENTION

A multi-endpoint communication system comprising communication nodes linked in a tree structure by unicast connections includes a server to receive a request from a new communication node to join the tree structure. The system further includes a node selector to identify one of the plurality of communication nodes that is likely to be in a same local area network as the new communication node. In one embodiment, the identified node is more likely to be in the same local area network if it shares a net or subnet address with the new node.

In addition, the system includes a node linker to connect the new communication node to the identified communication node within the tree structure. The node linker may need to rearrange at least a portion of the tree structure to accommodate the new communication node or to remove existing unnecessary nodes.

DETAILED DESCRIPTION OF PREFERRED EMBODIMENTS

Figure 1:
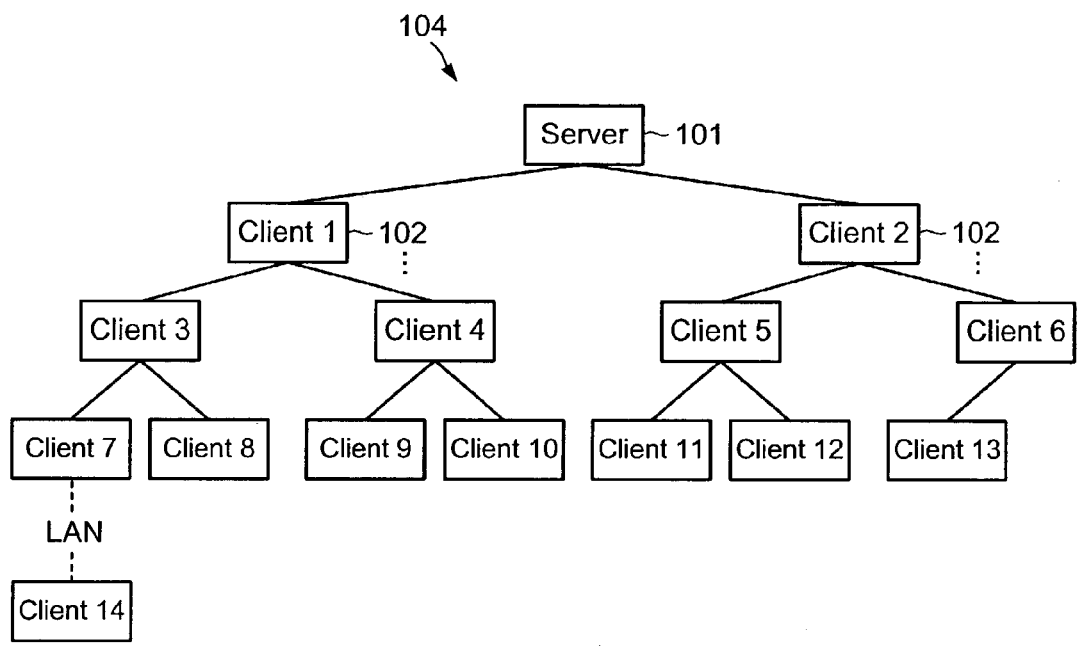
FIG. 1 is a block diagram of a multi-endpoint communication system including a multicast tree.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 depicts a multi-endpoint communication system 100 that uses unicast connections to simulate IP multicast. As illustrated, the system 100 includes a server 101 and plurality of communication nodes (or "clients") 102. The server 101, itself, may be embodied as a communication node 102, but is separately referenced herein for purposes of clarity.

In one embodiment, the server 101 sends data to two (or more) clients 102 by unicast. Thereafter, each client 102 rebroadcasts the data to two more clients 102, and so on. In this way, a multicast tree 104 is formed. Except for the server 101 and leaf nodes 102, each intermediate node 102 is both a receiver and a transmitter and may be referred to as a repeater.

Each repeater not only plays the data stream back to its audience, but also transmits the data to two other child nodes 102. Accordingly, the multicast tree 104 simulates IP multicast, without the need for Class D IP addresses, special routers, and the like. Such a multi-endpoint communication system 100 may be used to implement a Distance Education System (DES), in which a teacher may share audio, video, and/or data with a number of students at geographically diverse locations.

Unfortunately, conventional techniques for constructing multicast trees 104 are inefficient. For example, suppose that a new student at Client 14 wishes to join the "classroom." A typical algorithm would attempt to create a balanced tree 104 by connecting Client 14 to Client 6, minimizing the number of "hops" from the server 101.

However, suppose that client 14 is in the same Local Area Network (LAN) as Clients 1, 3, and 7, which are in a different branch of the multicast tree 104 than Client 6. Typically, communication over a LAN offers higher bandwidth and lower latencies than communication over a Wide Area Network (WAN). Hence, connecting Client 14 to Client 6, while efficient in the number of hops, may actually result in higher latencies and reduced bandwidth. In large, multi-endpoint communication systems 100, such inefficiencies occur frequently, and compounded latencies at the leaf nodes 102 may become unacceptably high.

As described herein, a novel unicast-based multicast protocol allows the multicast tree 104 to become unbalanced depending on the characteristics of the client nodes 102. In particular, the protocol attempts to connect nodes 102 in the same subnet/net as close as possible in consideration of the higher bandwidth and lower latencies available. Hence, as shown in FIG. 1, Client 14 may be connected, instead, to Client 7.

Figure 2:
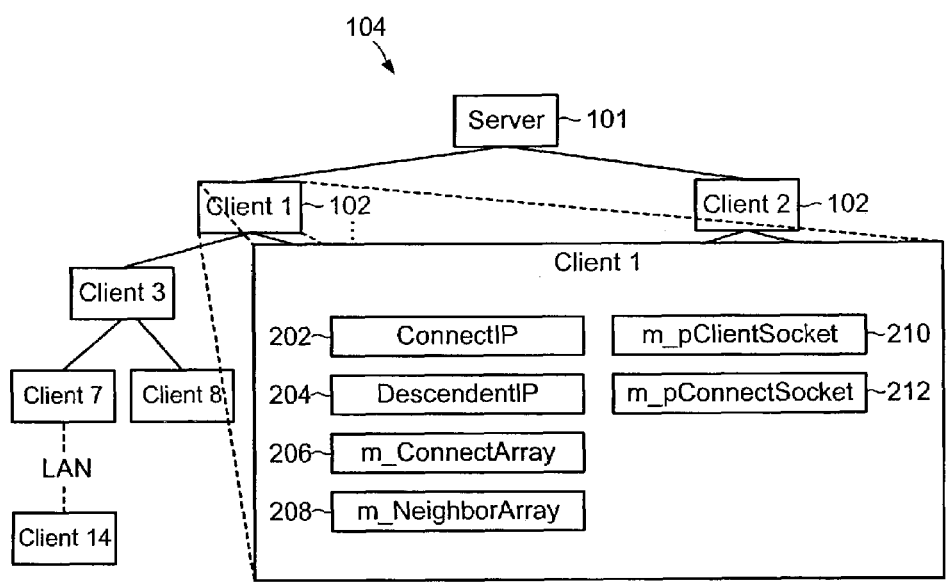
FIG. 2 is a block diagram of data elements maintained by a client node.

Referring to FIG. 2, certain information about the multicast tree 104 is maintained at the server 101 and each communication node 102. For example, a node 102 may store:

1. its parent IP address (except server),
2. its direct children IP addresses (except leaf nodes),
3. all its descendents' IP, subnet or net addresses,
4. socket connection with its parent (except server),
5. socket connection with the server (except server), and
6. socket connections with its direct children (except leaf nodes).

Of course, other types of data may be stored, depending on the type of network and the protocols being used.

In one configuration, the children and descendents' IP addresses are stored in two arrays: a ConnectIP array 202 and a DescendentIP array 204. The ConnectIP array 202 contains the IP addresses of its direct children, and the DescendentIP array 204 contains the net/subnet/IP addresses of all its descendents.

The DescendentIP array 204 is a two-dimensional array in which the number of rows is determined by the number of allowed children connections. For example, if the maximum number of direct children for a node 102 is two, the number of rows in the DescendentIP array 204 will be two, and a binary tree will be built. If the maximum number of direct children is three or four, then the number of rows in the DescendentIP array 204 will be three or four. Each node 102 can have a different number of children.

The contents of the DescendentIP array 204 depend on the characteristics of the IP addresses of the current node 102 and the new client 102 that wants to join the tree 104. If, for example, the current node 102 and the new client 102 are in the same subnet, the IP address of the new client is saved in the DescendentIP array 204. On the other hand, if the current node 102 and the new client 102 are in a different subnet but in the same net, then the subnet address of the new client 102 is saved in the DescendentIP array 204, but only if the subnet address was not previously saved in the DescendentIP array 204. In one embodiment, if the subnet address is already in the DescendentIP array 204, nothing happens.

If the current node 102 and the new client 102 are in different nets, then the net address is saved in the DescendentIP array 204, but only if the net address was not previously in the DescendentIP array 204. This way, one can assure that only a single entry exists in the DescendentIP array 204 for each net, subnet or IP address. The advantage of this method is to shorten the length of the DescendentIP array 204, thus making the search of the existing net, subnet and IP address faster and making the multicast tree 104 more scalable.

Suppose, for example, that to build a binary tree 104, there are 20,000 students, all of which are in the same subnet, but in a different subnet than the server 101. In such a case, at the server side, the size of the DescendentIP array 204 will be only two, one entry for each branch of the tree 104.

In one embodiment, Windows Sockets are used for the tree construction. Hence, the existing socket connections should be maintained by each node 102 so that control messages and application data can be sent using a TCP (Transmission Control Protocol) or UDP (User Datagram Protocol) channel.

The existing sockets may be configured as follows. Each client 102 has a direct socket connection with the server 101 and a socket connection with its parent. Also, each non-leaf client 102 has socket connections with all its direct children. The first connection is to ensure that each client 102 can send requests, such as a disconnect message, directly to the server 101 for processing. The second connection is to enable each client 102 to send control messages to its parent. The last connections are used to broadcast or multicast data and control messages along the tree 104. The data members used to store these sockets are explained below.

On the server side, m_ConnectArray 206 contains the socket connections between the server 101 and all its descendents, and the m_NeighborArray 208 contains the socket connections between the server 101 and its directly connected children. On the client side, m_pClientSocket 210 points to the socket connection between the client 102 and the server 101, while m_pConnectSocket 212 points to the socket connection between the client 102 and its parent, and m_NeighborArray 208 contains the socket connections between this client 102 and all its directly connected children.

Figure 3:
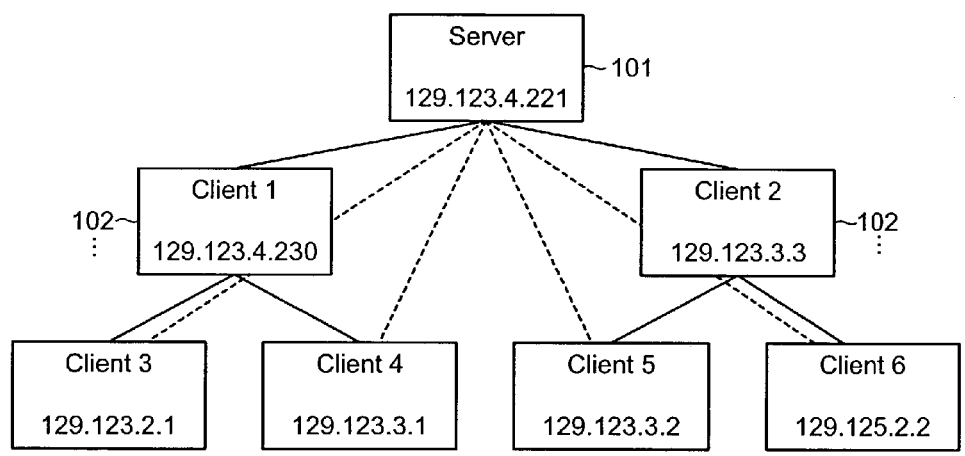
FIG. 3 is a block diagram of a multi-endpoint communication system including a multicast tree.

To make this more clear, suppose that a network has the topology illustrated in FIG. 3 with the following IP addresses:

Server: 129.123.4 221
Client 1 (C1): 129.123.4.230
Client 2 (C2): 129.123.3.3
Client 3 (C3): 129.123.2.1
Client 4 (C4): 129.124.3.1
Client 5 (C5): 129.123.3.2
Client 6 (C6): 129.125.2.2

Assuming that the subnet mask is 255.255.255.0, the information maintained by the server 101 and each client 102 about the multicast tree 104 is as follows:

Server: ConnectIP[ ]={129.123.4.230; 129.123.3.3}
DescendentIP[ ]={129.123.4.230, 129.123.2.0, 129.124.0.0; 129.123.3.0, 129.125.0.0}
m_ConnectArray: contains the socket connections with C1 . . . C6.
m_NeighborArray: contains the socket connections with C1 and C2.

Client 1: ConnectIP[ ]={129.123.2.1; 129.124.3.1}
DescendentIP[ ]={129.123.2.0; 129.124.0.0}
m_pConnectSocket: points to the socket connections with server.
m_pClientSocket: points to the socket connection with server.
m_NeighborArray: contains the socket connections with C3 and C4.

Client 2: ConnectIP[ ]={129.123.3.2; 129.125.2.2}
DescendentIP[ ]={129.123.3.2; 129.125.0.0}
m_pConnectSocket: points to the socket connections with server.
m_pClientSocket: points to the socket connection with server.
m_NeighborArray: contains the socket connections with C5 and C6.

Clients 3&4: m_pConnectSocket: points to the socket connection with Client 1.
m_pClientSocket: points to the socket connection with server.

Clients 5&6: m_pConnectSocket: points to the socket connection with Client 2.
m_pClientSocket: points to the socket connection with server.

On the server side, because Client 2 and Client 5 are in the same subnet (i.e. 129.123.3.0), there is only one entry for this subnet in the DescendentIP array 204.

Figure 4:
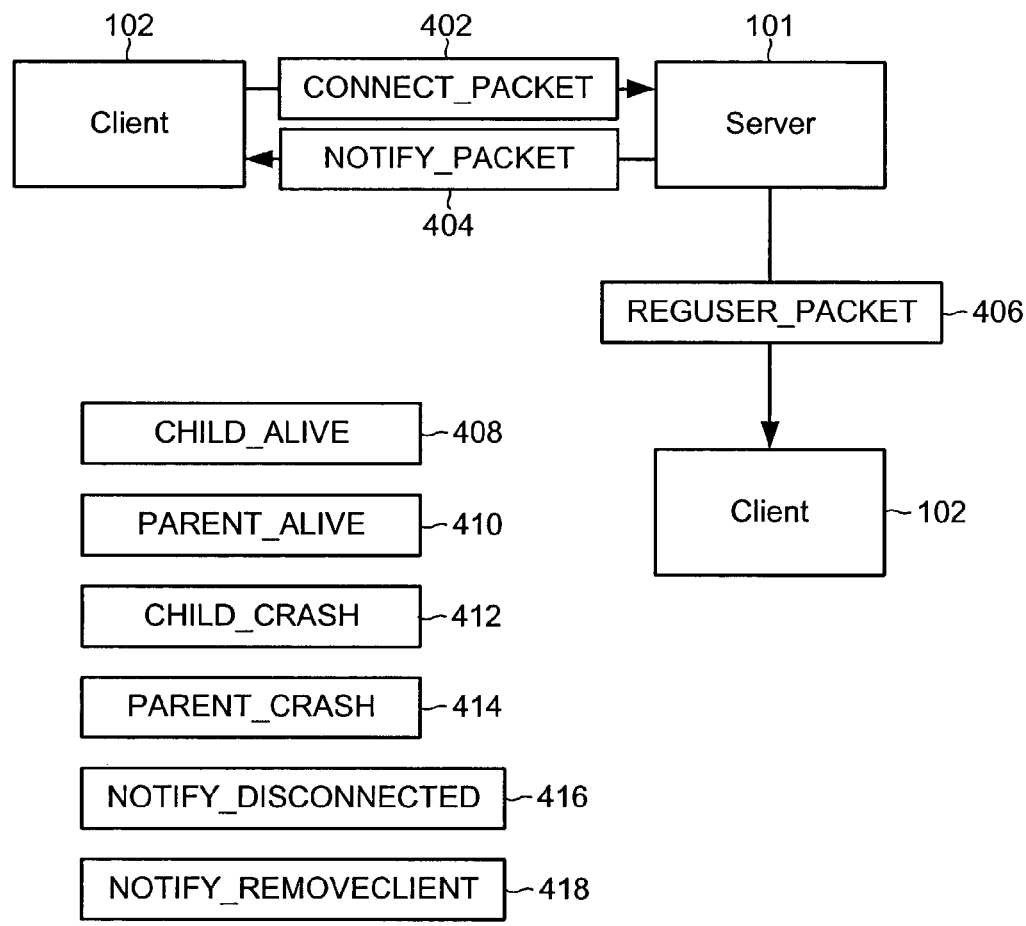
FIG. 4 is a block diagram of messages sent between various client nodes and between client nodes and a server.

Referring to FIG. 4, in order to construct the multicast tree 104 in accordance with the protocol described herein, several messages may be sent between one or more nodes 102 and between a node 102 and the server 101. These messages can be categorized into two groups: one that is related to the tree construction and one that is related to tree maintenance.

In the depicted embodiment, three messages relate to tree construction: the CONNECT_PACKET 402, the REGUSER_PACKET 406 and the NOTIFY_PACKET 404. When a new client 102 wants to join the multicast tree 104 for the first time, it will establish a temporary socket connection with the server 101 and send a CONNECT_PACKET 402 to the server 101 using, for example, the TCP channel.

After receiving this packet, the server 101 will attempt to find the right place in the tree 104 for this client 102 according to the Connection Protocol, as will be described in greater detail below. If the client 102 can connect to the server 101 directly, the server 101 will add its IP address to the ConnectIP array 202 and the DescendentIP array 204. It will then send a NOTIFY_PACKET 404 informing the client 102 that it has joined the tree 104 successfully. After receiving the NOTIFY_PACKET 404 from the server 101, the client 102 will establish a permanent socket connection with the server 101, and this socket connection will be saved in the corresponding data members described above for later use.

If the client 102 cannot connect to the server 101 directly because, for example, there is no open branch available at the server side, or a closer client 102 already exists in the tree 104 (here "closer" means that two nodes are in the same subnet or net), then the server 101 will forward the connect request to the branch where the closer client 102 resides using the TCP channel. Here, the REGUSER_PACKET 406 may be used instead of the CONNECT_PACKET 402.

When a direct child of the server 101 that resides on the branch where the REGUSER_PACKET 406 is sent receives this packet, it will process the packet in the same way as the server 101 processes the CONNECT_PACKET 402. For example, it either adds the new client to its ConnectIP array 202 and DescendentIP array 204 and sends the NOTIFY_PACKET 404 to the new client 102 or forwards the packet to a better place using the REGUSER_PACKET 406. This procedure continues until the new client 102 joins the multicast tree 104 successfully. Thereafter, a permanent socket connection is established and saved.

It can be seen that the above-described procedure is a kind of a recursive process in which the protocol decides when the recursion terminates. The result is the construction of a multicast tree 104 which is optimal with respect to network distance.

As illustrated in FIG. 4, the second group of messages, relating to tree maintenance, includes: CHILD_ALIVE 408, PARENT_ALIVE 410, CHILD_CRASH 412, PARENT_CRASH 414, NOTIFY_DISCONNECTED 416 and NOTIFY_REMOVECLIENT 418. These messages are used when clients 102 crash or want to leave the tree 104, or when network problems prevent clients 102 from having access to the tree 104. In these situations, the server 101 and the ancestor nodes modify their ConnectIP array 202 and DescendentIP array 204 accordingly, and the relevant socket connection are closed to reflect the changes in the tree topology. In addition, when a parent node leaves the tree 104, the children need to rejoin the multicast tree 104.

In one embodiment, when a client 102 wants to leave the tree 104 by itself, it will send the NOTIFY_DISCONNECTED 416 packet to the server. When the server 101 receives this packet, it modifies the ConnectIP array 202 and DescendentIP array 204 and closes the relevant socket connections. To do so, the server 101 may send the NOTIFY_REMOVECLIENT 418 packet. This packet will be forwarded along the branch of the node 102 that wants to leave until its parent is located.

In one embodiment, those nodes 102 that receive this packet will do the same cleanup as the server 101. Included in the NOTIFY_DISCONNECTED 416 packet and the NOTIFY_REMOVECLIENT 418 packet is a flag that determines how the DescendentIP array 204 should be modified. This flag will be discussed below in detail in connection with the Disconnection Protocol.

Figure 5:
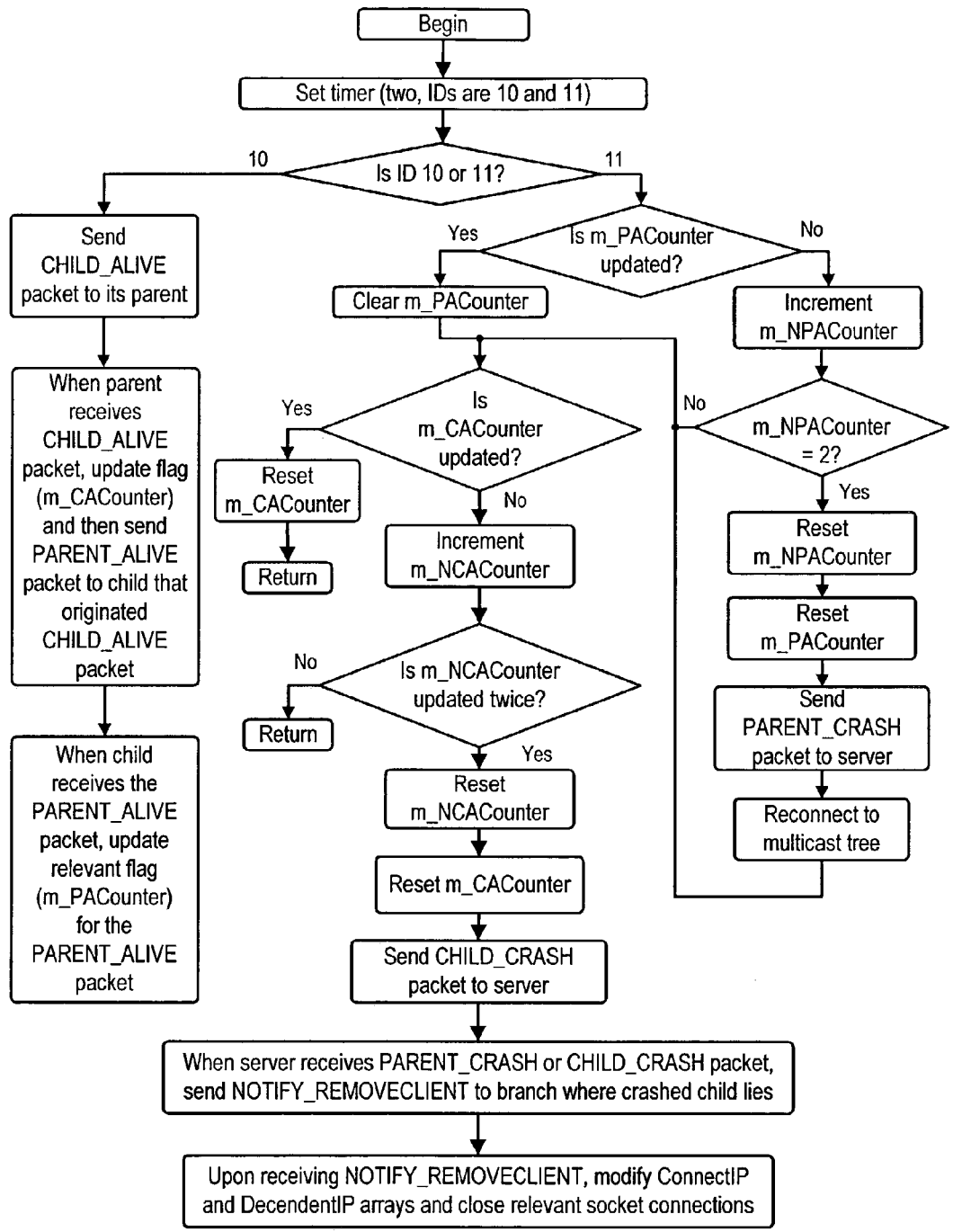
FIG. 5 is a flowchart of a Client Crash Protocol.

FIG. 5 is a flow chart of one embodiment of a Client Crash Protocol. When a client 102 crashes, it cannot send a message to the server 101 to inform it of its crash. In order to detect the occurrence of a crashed client 102, the following sequence may occur.

In the depicted embodiment, two timers are set. Each time a timeout defined by timer 1 occurs, each child except the server 101 will send a CHILD_ALIVE 408 packet to its parent. Upon receiving the CHILD_ALIVE 408 packet, the parent node will update a flag, m_CACounter, to indicate that a CHILD_ALIVE 408 packet is received and the child is still alive. Thereafter, it will send a PARENT_ALIVE 410 packet to the child that originates the CHILD_ALIVE 408 packet. After receiving the PARENT_ALIVE 410 packet, the child will set a flag, m_PACounter, to indicate that PARENT_ALIVE 410 is received and the parent is still functioning.

When a timeout defined by timer 2 occurs, each node 102 will check its m_CACounter and m_PACounter flags. If both flags are set, it means its parent and children are all working correctly and it will reset these flags. If the m_CACounter is not set, it will update a flag, m_NCACounter, to indicate this situation. In consideration that the CHILD_ALIVE 408 packet may be lost yet the child is still alive, one lost packet will be allowed. Accordingly, if the m_NCACounter is updated twice consecutively, it means that one of its children has crashed and it will send the server 101 the CHILD_CRASH 412 packet that contains the IP address of the crashed child.

If the m_PACounter is not set, it will update a flag, m_NPACounter, to indicate this situation. As with the m_NCACounter, if the m_NPACounter is updated twice consecutively, it means that its parent has crashed, so it will send the PARENT_CRASH 414 packet containing the IP address of the parent to the server 101. In addition, if the parent crashes, the child will have to rejoin the tree 104. Accordingly, after a few seconds (this is to make sure that the PARENT_CRASH 414 packet has arrived at the server 101), the REGUSER_PACKET 406 packet is sent to the server 101 to request to rejoin the multicast tree 104. When the server 101 receives the CHILD_CRASH 412 or PARENT_CRASH 414 packet, it will send a NOTIFY_REMOVECLIENT 418 packet along the branch where the crashed client 102 lies.

Figure 6:
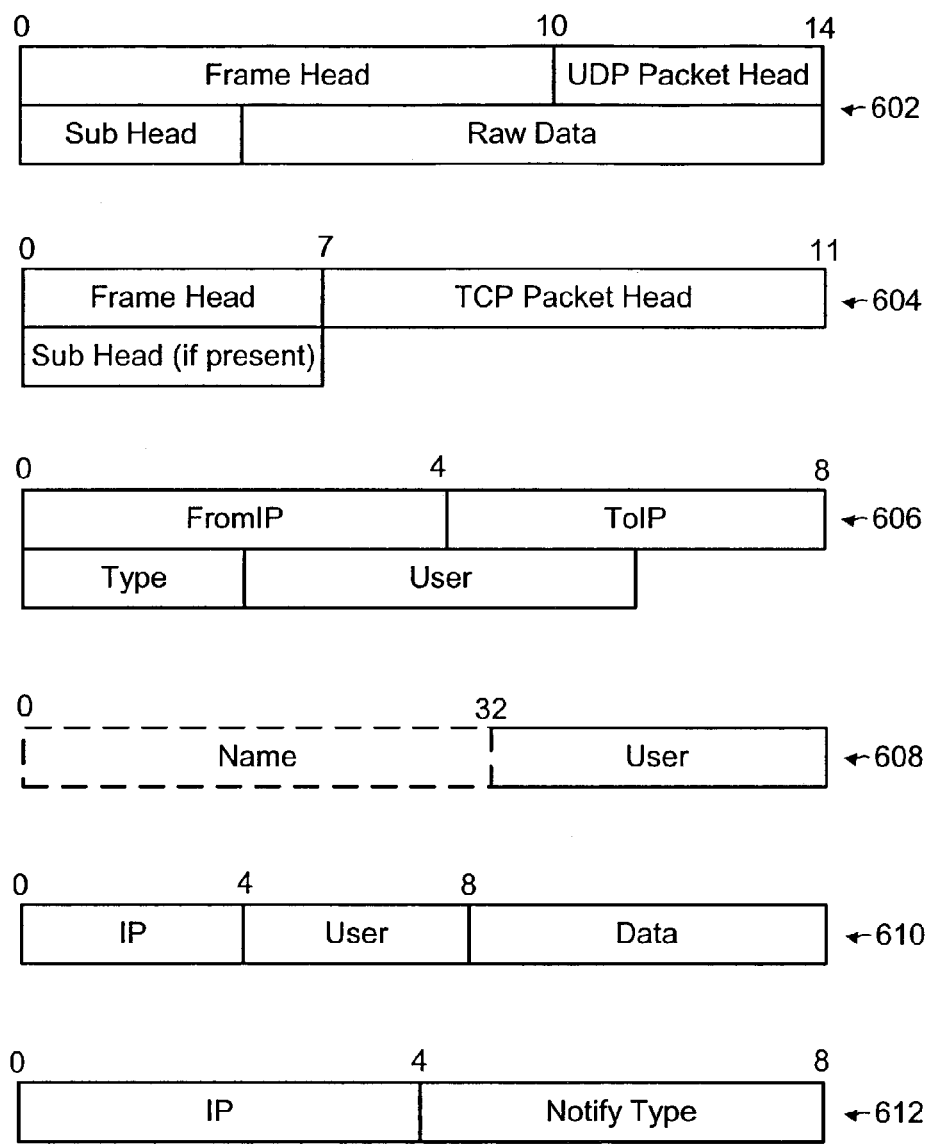
FIG. 6 is a structural diagram of a UDP frame, a TCP frame, a Packet Head, and various Sub Heads.

FIG. 6 illustrates structures for a UDP frame 602, a TCP frame 604, a Packet Head 606, and various Sub Head 608, 610, 612, according to an embodiment of the invention. In one embodiment, the only difference between the UDP and TCP frame structures is that there is no Raw Data field for the TCP frame 604. This is because, in one implementation, all application data are sent using a UDP channel. As all the above connection and maintenance messages are control messages and are sent using the TCP channel in one embodiment, a detailed description of only the TCP frame 604 is given, where:

Frame Head (10 bytes) contains 4 data members:
SendType: 1 byte;
FrameLength: 2 bytes;
FrameNumber: 4 bytes.
SendType defines the type of the frame, such as:
MULTICAST_FRAME
UNICAST_FRAME
BROADCAST_FRAME
For messages related to the tree construction and maintenance, they are all UNICAST_FRAME in one embodiment.
FrameLength defines the length of the frame content.
FrameNumber is the sequence number for each frame.
In one embodiment, a Packet Head 606 may be configured as follows:
FromIP (4 bytes): the destination IP address.
ToIP (4 bytes): the source IP address.
Type (2 bytes): the purpose of the packet could be: CONNECT_PACKET, REGUSER_PACKET, NOTIFY_PACKET, CHILD_ALIVE, PARENT_ALIVE, CHILD_CRASH, PARENT_CRASH, NOTIFY_DISCONNECTED and NOTIFY_REMOVECLIENT.
User (4 bytes): varies with the different type of packet. For the CHILD_CRASH, PARENT_CRASH and NOTIFY_REMOVECLIENT packets, it may contain the IP address of the client that crashes or leaves the tree 104. For other packets, this field is reserved.

In the depicted embodiment, a CONNECT_PACKET Sub Head 608 may include the following information:
Name (32 bytes): Username of the client.
User (4 bytes): Reserved.

As illustrated, a REGUSER_PACKET Sub Head 610 may be configured as follows:
IP (4 bytes): the IP address of the new client 102 that wants to join the tree 104.
User (4 bytes): the number of descendents of the new client 102. In one embodiment, when a parent node 102 leaves the tree 104, the child node 102 will try to rejoin the tree 104. But at this time, it may already have descendents connected to it. In such a case, the node 102 and its descendents will be treated as a whole to maintain the subtree that was already established.
Data (variable size): the IP addresses of the descendents mentioned above. Its size depends on the number of descendents. These IP addresses are the entries in the DescendentIP array 204.

As shown, a NOTIFY_PACKET Sub Head 612 may include one or more of the following:
User (4 bytes): reserved, always be set to 0 (the IP address of the parent node 102 that sent this packet can be obtained from the FromIP field of the Packet Head 606.
NotifyType (4 bytes): the only value for this parameter is NOTIFY_ACCEPTED in one embodiment.

In one configuration, two additional Sub Heads (not shown) may be provided, e.g., NOTIFY_DISCONNECTED NOTIFY_REMOVECLIENT. The content is the same for these two packets, i.e. a flag stating whether the child that needs to be removed from the tree 104 is the last one in the tree of that specific net or subnet that the child is in. In one embodiment, its value can be 00, 01, and 10. The meaning of these three values will be given in detail in conjunction with the Disconnection Protocol.

A Connection Protocol is now disclosed in accordance with an embodiment of the invention that increases the efficiency of the multicast tree 104. For purposes of the following description, several terms are defined as follows:
Node—the current client node 102 in the multicast tree 104 making a connection decision;
Client—the client node 102 wanting to connect to or disconnect from the multicast tree 104;
Child—any client node 102 that is directly connected to another client node 102 in a subordinate level of the multicast tree 104;
Descendent—any client node 102 in a path between a particular client node 102 and the leaves of the multicast tree 104.

Figure 7:
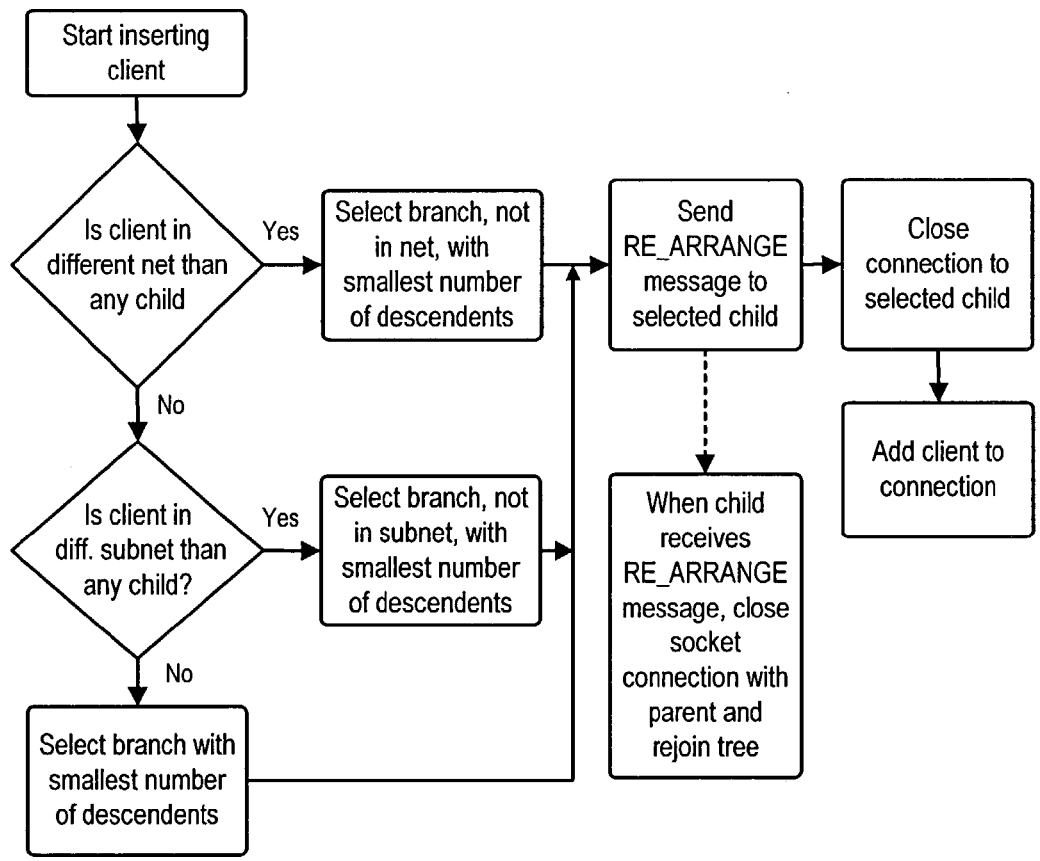
FIG. 7 is a flowchart of an Insert Client Protocol.
Figure 8:
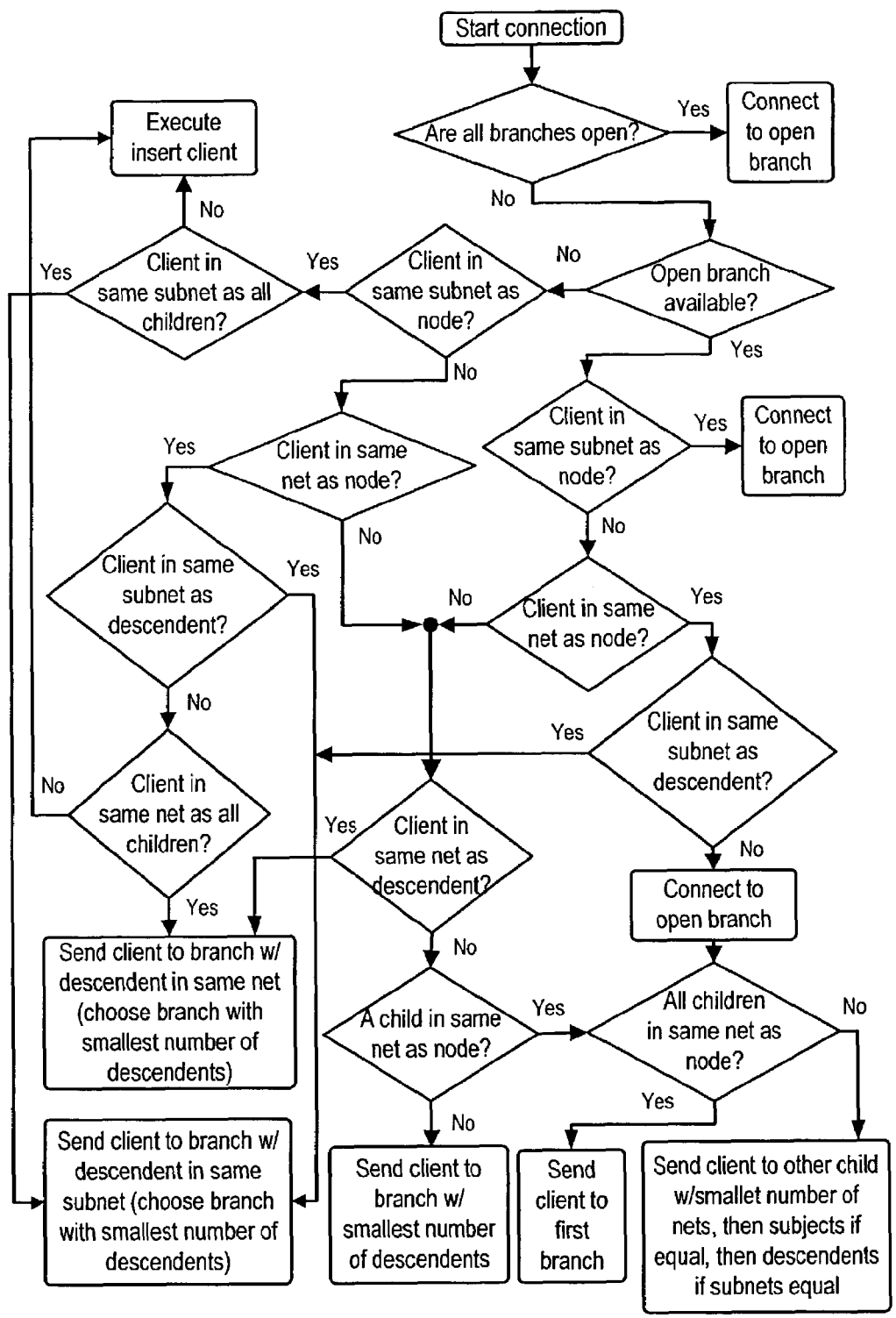
FIG. 8 is a flowchart of a Connection Protocol.

FIG. 7 is a flowchart of an Insert Client Protocol, which is part of the overall Connection Protocol depicted in FIG. 8. The purpose of the Insert Client protocol is illustrated as follows. Suppose Node A already has two children, Nodes B and C, but Nodes A, B and C are in different nets. Suppose further that a new, closer node, Node D, which is in the same net as Node A, requests to join the tree 104.

Because Nodes A and D are in the same net, it will be better from an efficiency standpoint to connect them together. Accordingly, either Node B or Node C needs to be disconnected from Node A to leave a space for Node D. To do so, it will send a REARRANGE packet to the client that needs to be disconnected, assume Node B in this case, to inform it that the current place is not suitable, after which it disconnects from Node B.

Thereafter, Node D connects to the Node A, since there is one branch open now. Upon receiving the REARRANGE message, Node B will close its connection with Node A. After Node D has successfully connected to Node A, Node A will try to forward Node B to either Node C or Node D according to the Connection Protocol so that Node B can continue to receive messages.

In this case, although Node B needs to rejoin the tree 104, it does not do so by sending REGUSER_PACKET 406 to the server 101. The reason is that, as Node B originally resided on this branch, it would be reasonable to think this branch is the best place for it. As a result, the reconnection procedure can continue right from here instead of from the beginning to reduce reconnection time.

A detailed flowchart of the Connection Protocol is shown in FIG. 8. As illustrated, when a node 102 receives the CONNECT_PACKET 402 or REGUSER_PACKET 406, it first checks to see if it has a child. If it has no child, it will connect the new client 102 directly. Otherwise, it will check if there exists any descendent in the tree 104 that is in the same subnet/net as the new client 102. If such descendent is found, it will forward the connection request to the branch where the descendent lies. If none of the above conditions is satisfied, it will choose the branch with the smaller number of children. As it is safe to assume that high bandwidth and low latency are available within the same subnet/net than in a different net, the tree 104 formed according to the above connection protocol will be of optimum performance.

Figure 9:
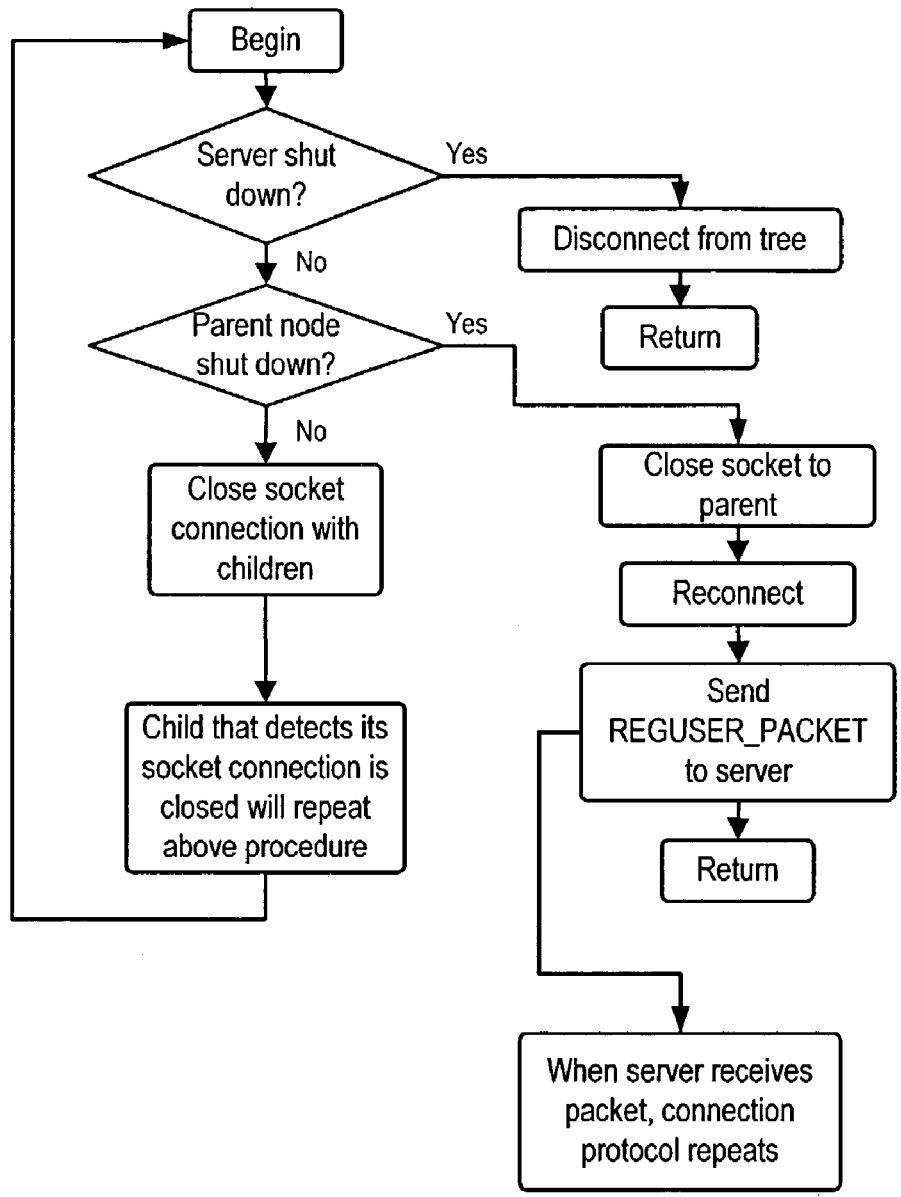
FIG. 9 is a flowchart of a Disconnection Protocol.

FIG. 9 is a flowchart of a Disconnection Protocol according to an embodiment of the invention. When a client 102 crashes or wants to leave the multicast tree 104, the tree 104 is modified so that the descendants of the client 102 can continue to participate. In one embodiment, the relevant socket connections are closed and the IP address of the client 102 is removed from the ConnectIP array 202 and from the DescendentIP array 204, as explained above.

When one side of the socket connection is closed, the other side will notice it and will try to determine the reason for the closure. If the other side is the server 101, it means that the server 101 has closed the session so it needs to shut down. If the other side is its parent node 102, it will try to rejoin the multicast tree 104 by sending the REGUSER_PACKET 406 to the server 101. In addition, when a client 102 wants to leave, it closes its socket connections with all of its children to inform them that their parent has left the tree 104 and they need to rejoin.

In order to modify the ConnectIP array 202 and the DescendentIP array 204 when a client 102 needs to be removed from the multicast tree 104 (whether it leaves by itself, is disconnected by the server, or crashes), the NOTIFY_REMOVECLIENT 418 packet is sent. Included in this packet is a flag stating whether the client 102 that needs to be removed from the tree 104 is the last one in the tree 104 of that specific net or subnet.

In one embodiment, a flag of 00 means that the client is the last one. In such a case, the server 101 and all of the client's ancestor nodes 102 remove it from their respective DescendentIP arrays 204. If the flag is 01, it means that it is not the last one in terms of the subnet. Accordingly, its subnet address need not be removed from the DescendentIP array 204. Similarly, if the flag is 10, its net address need not be removed.

When a node 102 receives the NOTIFY_REMOVECLIENT 418 packet, it first checks to see if the IP address included in the packet is in its ConnectIP array 202. If so, it is a direct child. Accordingly, all of the ConnectIP and DescendentIP arrays 202, 204 are cleared. Otherwise, the DescendentIP array 204 is modified only if the flag is not equal to 00, and the NOTIFY_REMOVECLIENT 418 packet is forwarded along the branch where the parent of the crashed child lies until the parent is reached.

Figure 10:
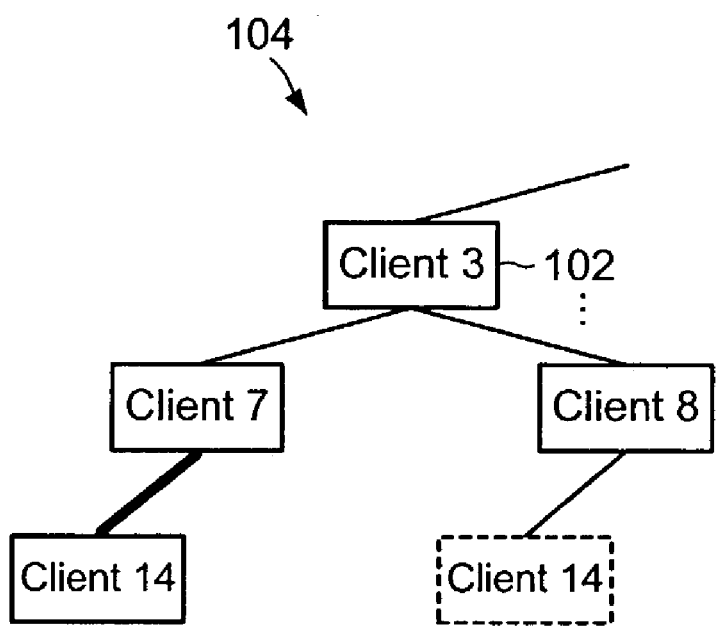
FIG. 10 is a block diagram of a portion of a multicast tree.

FIG. 10 illustrates an optional improvement to the Connection Protocol. In certain cases, two nodes 102 may be in the same LAN, but one node 102 may be connected by a low-bandwidth (e.g., dial-up) connection, while the other node 102 is connected by a high-bandwidth connection (e.g., T-1, fiber). In this situation, the bandwidth between the two nodes 102 would not be high, and long latencies might exist between the nodes 102.

As illustrated, suppose that Client 14 wishes to join the multicast tree 104 and two join points are possible, i.e., Client 7 or Client 8. In the depicted example, Clients 7 and 14 are in different LANs and have different subnet addresses. Clients 8 and 14, on the other hand, are in the same LAN.

Per the Connection Protocol described above, Client 14 would be normally connected to Client 8. However, suppose that Client 8 uses a dial-up connection, while Client 7 uses a high-bandwidth connection. In such a circumstance, it would be better for Client 14 to be connected to Client 7.

In one embodiment, the Connection Protocol constructs the tree 104 according to both the IP addresses and the connection speeds (bandwidth) of the nodes 102. Priorities are given first to those nodes 102 that are in the same net/subnet and have high-speed connections, then to those nodes that have high-speed connection but are not in the same net/subnet, and finally to the nodes that are in the same net/subnet, but do not have high-speed connections.

To accomplish the foregoing, the server 101 and each node 102 may maintain an indication of the connection speed with its parent and/or each direct child. Such information may be stored, for example, in conjunction with the ConnectIP array 202.

In one embodiment, the decision of whether to transmit video data is decided by the server 101. If a few low-speed connections exist, the server 101 may decide not to transmit video as it takes a great deal of bandwidth, although most nodes 102 have the bandwidth to receive the video data.

In another embodiment, each client 102 may decide whether to transmit the video to its direct children according to the connection speeds with its direct children. Accordingly, those clients 102 that have higher connection speeds will be able to receive the video data and those that have lower connection speeds will not in one embodiment.

In yet another embodiment, each client 102 may determine the number of connections to children based on its knowledge of its own available bandwidth. Clients 102 with high bandwidth connections to its WAN (and/or within its LAN) may choose to have more connections. For instance, one client 102 may be connected to its WAN via a T1 or better line. Accordingly, it may determine that it may have 5 connections rather than 2.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A method for simulating multicast connections
   receiving at a receiving communication node in a tree structure a request from a new communication node to join the tree structure, the tree structure comprising a plurality of communication nodes linked using unicast connections; and
   evaluating at the receiving communication node whether the receiving communication node has a greatest permitted number of child nodes connected thereto and whether the new communication node belongs to a same subnet as the receiving communication node and whether one of the child nodes connected to the receiving communication node does not belong to the same subnet as the receiving communication node, and, if so, connecting the new communication node to the receiving communication node and disconnecting the child node of the receiving communication node that does not belong to the same subnet as the receiving communication node, and, if not, transmitting a request to join the tree structure identifying the new communication node to the child node of the receiving communication node closest to the new communication node.

2. The method of claim 1, further comprising determining which of the child nodes of the receiving communication node is closest to the new communication node by identifying the child node of the current node that shares a portion of a network address with the new communication node.

3. The method of claim 2, wherein the network address comprises an Internet Protocol (IP) address.

4. The method of claim 1, further comprising determining which of the child nodes of the receiving communication node node is closest to the new communication node by identifying the child node of the receiving communication node that shares a subnet address with the new communication node.

5. The method of claim 1, further comprising maintaining at a communication node a network address for a parent node and any child nodes in the tree structure.

6. The method of claim 1, further comprising maintaining at a communication node at least a portion of a network address for any descendant nodes in the tree structure.

7. The method of claim 1, further comprising maintaining at a communication node a socket connection with a server node, a parent node, and any child nodes in the tree structure.

8. The method of claim 1, further comprising determining the maximum number of child nodes for a communication node based on an amount of bandwidth available to the communication node.

9. The method of claim 8, wherein connecting comprises rearranging at least a portion of the tree structure to accommodate the new communication node.

10. The system of claim 1, wherein at least a portion of the communication nodes of the tree structure are to repeat data received from a parent node to one or more child nodes in the tree structure, each communication node being configured to play the data back to its audience and transmit the data to the child nodes.

11. A method for simulating multicast connections in a multi-endpoint communication system, the method comprising:
receiving at a receiving communication node a request to join a tree structure, the request identifying an unassigned communication node, the tree structure including a plurality of communication nodes in a tree structure using unicast connections, wherein at least a portion of the communication nodes are to repeat data received from a parent node to one or more child nodes in the tree structure, at least a portion of the communication nodes being configured to play the data back to its audience and transmit the data to the child nodes;
evaluating at the receiving communication node whether the unassigned communication node belongs to a same subnet as the receiving communication node and one of the child nodes connected to the receiving communication node does not belong to the same subnet as the receiving communication node and, if so, adding an identifier of the unassigned communication node to a list stored by the receiving communication node of communication nodes connected thereto, and transmitting an instruction to the child node that does not belong to the same subnet as the receiving communication node to reconnect to the tree structure.

12. The method of claim 11, further comprising, transmitting from the receiving communication node to the child node of the receiving communication node closest to the unassigned communication node a request to join the tree structure identifying the unassigned communication node if either the unassigned communication node does not belong to the same subnet as the receiving communication node or one of the child nodes connected to the receiving communication node does belong to the same subnet as the receiving communication node.

13. The method of claim 11, wherein each communication node maintains a socket connection with a server node and a parent node in the tree structure.

14. A system comprising:
a plurality of communication nodes linked in a tree structure using unicast connections having a communication node configured as a server at the top of the tree structure, a plurality of communication nodes each coupled to a parent node and one or more child nodes by means of first socket connections, the communication nodes also coupled directly to the server by means of second socket connections;
wherein the communication nodes are configured to broadcast through the tree structure by means of the first socket connections, wherein at least a portion of the communication nodes are to repeat data received from a parent node to one or more child nodes in the tree structure over the first socket connections; and
wherein the communication nodes are configured to disconnect and reconnect to the tree structure by sending messages to the server over the second socket connections,
wherein the communication nodes are further configured to
receive a request from an unassigned node to join the tree structure; and
evaluate whether the unassigned node belongs to a same subnet as the current node and whether one of the child nodes connected to the communication node does not belong to the same subnet as the communication node, and, if so, connect the unassigned node to the communication node and disconnect the child node that does not belong to the same subnet as the current node, and, if not, transmitting a request to join the tree structure identifying the unassigned node to the child node of the communication node closest to the unassigned node.

15. The system of claim 14, wherein the plurality of communication nodes are further configured to maintain a list of child nodes connected thereto and a list of descendents of the child nodes connected thereto; and wherein the communication node functioning as the server is farther configured to receive an indication that a disconnecting node of the communication nodes has at least one of disconnected from the tree structure or has requested to disconnect from the tree structure, to transmit down through the tree structure an instruction to remove reference to the disconnecting node from the list of child nodes and list of descendents maintained by each communication node, and to transmit an instruction from the communication node functioning as the server to descendent communication nodes of the disconnecting node to attempt to reconnect to the tree structure.

* * * * *

UNITED STATES PATENT AND TRADEMARK OFFICE
CERTIFICATE OF CORRECTION

| | | |
|---|---|---|
| PATENT NO. | : 7,596,595 B2 | Page 1 of 1 |
| APPLICATION NO. | : 10/464619 | |
| DATED | : September 29, 2009 | |
| INVENTOR(S) | : Budge et al. | |

It is certified that error appears in the above-identified patent and that said Letters Patent is hereby corrected as shown below:

Column 11:
Line 18, delete "node node" and insert --node--

Column 12:
Line 54, delete "farther" and insert --further--

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,596,595 B2 Page 1 of 1
APPLICATION NO. : 10/464619
DATED : September 29, 2009
INVENTOR(S) : Budge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1600 days.

Signed and Sealed this

Twenty-eighth Day of September, 2010

David J. Kappos
*Director of the United States Patent and Trademark Office*